United States Patent
Lin

(10) Patent No.: US 8,672,640 B2
(45) Date of Patent: Mar. 18, 2014

(54) FAN ROTATION SPEED CONTROL SYSTEM AND METHOD

(75) Inventor: Hung-Ming Lin, New Taipei (TW)

(73) Assignee: Quanta Computer Inc., Tao Yuan Shien (TW)

( * ) Notice: Subject to any disclaimer, the term of this patent is extended or adjusted under 35 U.S.C. 154(b) by 80 days.

(21) Appl. No.: 13/303,867

(22) Filed: Nov. 23, 2011

(65) Prior Publication Data

US 2013/0058794 A1    Mar. 7, 2013

(30) Foreign Application Priority Data

Sep. 7, 2011  (TW) ............... 100132195 A

(51) Int. Cl.
*F04B 49/20* (2006.01)
*F04B 49/06* (2006.01)

(52) U.S. Cl.
USPC .............................. 417/42; 417/63

(58) Field of Classification Search
USPC ...................... 417/42, 44.1, 45, 44.11, 53, 63
See application file for complete search history.

(56) References Cited

U.S. PATENT DOCUMENTS

| | | | | |
|---|---|---|---|---|
| 5,269,660 A | * | 12/1993 | Pradelle | 417/18 |
| 2008/0286088 A1 | * | 11/2008 | Chen et al. | 415/17 |
| 2010/0214739 A1 | * | 8/2010 | Guan | 361/679.48 |

* cited by examiner

*Primary Examiner* — Bryan Lettman
(74) *Attorney, Agent, or Firm* — McClure, Qualey & Rodack, LLP

(57) ABSTRACT

A fan rotation speed control system for controlling rotation speed of a fan is provided. The system has: a fan rotation speed controller, coupled to the fan, for receiving a signal value to produce a driving voltage to the fan and detecting an actual rotation speed of the fan; and a master controller, coupled to the fan rotation speed controller, for providing the signal value and recalculating the signal value by comparing the actual rotation speed with a target rotation speed.

8 Claims, 2 Drawing Sheets

FAN ROTATION SPEED CONTROL SYSTEM AND METHOD

CROSS REFERENCE TO RELATED APPLICATIONS

This Non-provisional application claims priority under 35 U.S.C. §119(a) on Patent Application No(s). 100132195, filed in Taiwan, Republic of China on Sep. 7, 2011, the entire contents of which are hereby incorporated by reference.

BACKGROUND OF THE INVENTION

1. Field of the Invention

The present invention relates to a fan rotation speed control technique.

2. Description of the Related Art

A fan is a common heat-dissipating device, which produces air flow to remove heat from components, such as central processing units (CPU), which generate heat but are temperature sensitive, to control the temperature variation thereof to within a specific range.

FIG. 1 is a schematic diagram of a heat-dissipating configuration in a laptop computer for illustrating how the prior art controls a heat-dissipating fan for the CPU in the laptop computer. The laptop computer 100 comprises a CPU 110, an embedded controller (EC) 120, a fan rotation speed controller 130, and a fan 140. The fan 140 produces air flow by rotating its blades (not shown) to remove heat accumulated by the CPU 110. The EC 120 continually monitors the temperature of the CPU 110 with temperature sensors (not shown), and outputs signal values, which may be in a specific coded form, to the fan rotation speed controller 130. Then, the fan rotation speed controller 130 linearly adjusts the driving voltage outputted to the fan 140 based on the signal value received from the EC 120 to control the rotation speed of the fan 140. At the same time, the fan rotation speed controller 130 receives information about the actual rotation speed of the fan 140 and reports it to the EC 120. Note that, in the prior art, the signal values outputted from the EC 120 run in "progression". For illustration, in the following examples, the signal values are hexadecimal codes ranging from (00) to (FF). When the EC 120 finds out that the actual rotation speed reported by the fan rotation speed controller 130 has not reached the target rotation speed (for example, the signal value 79), the next signal value sent by the EC 120 will increase by 1 (i.e., increasing from signal value 79 to signal value 7A) and then the process goes on and on till the actual rotation speed reaches the target rotation speed. Oppositely, when the EC 120 finds out that the actual rotation speed reported by the fan rotation speed controller 130 has exceeded the target rotation speed (for example, signal value 8F), the next signal value sent by the EC 120 will decrease by 1 (i.e., decreasing from signal value 8F to signal value 8E) and then the process goes on and on till the actual rotation speed returns to the target rotation speed.

For a computer system, the fans integrated therein may be from different sources (vendors), such that they may have different voltage-rotation speed characteristics. Therefore, an EC in a computer system should increase or decrease the signal value progressively and adjust the fan driving voltage gradually. However, for the prior art methods, a lot of time is needed for a fan to reach a target rotation speed (for example, if the EC 120 sends a signal value every second, and the signal value increases from 79 to 8E, it takes 20 seconds). In addition, for the prior art methods, it is difficult to control the fan to rotate at a stable rotation speed. A fan rotating too fast may cause noise and waste power, while a fan rotating too slowly may reduce the heat dissipation effect. Accordingly, the quality of a computer system may decrease.

Fan rotation speed control in the prior art is neither effective nor precise. Therefore, the present invention overcomes the defects in the prior art and provides a new system and method for controlling the fan rotation speed.

BRIEF SUMMARY OF THE INVENTION

The present invention provides a fan rotation speed control system for controlling rotation speed of a fan. The system comprises: a fan rotation speed controller, coupled to the fan, for receiving a signal value to produce a driving voltage to the fan and detecting an actual rotation speed of the fan; and a master controller, coupled to the fan rotation speed controller, for providing the signal value and recalculating the signal value by comparing the actual rotation speed with a target rotation speed.

The present invention also provides a fan rotation speed control method for controlling rotation speed of a fan. The method comprises the steps of: providing a signal value to produce a driving voltage to the fan; detecting an actual rotation speed of the fan; and recalculating the signal value by comparing the actual rotation speed with a target rotation speed.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Fan Rotation Speed Control System

Figure 1:
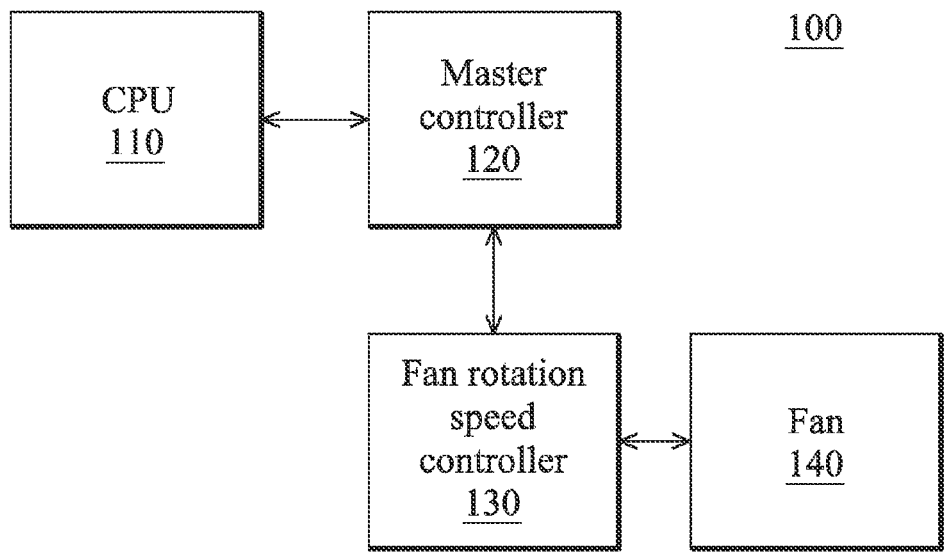
FIG. 1 is a schematic diagram of a heat-dissipating configuration in a computer.

The present invention provides a fan rotation speed control system to overcome the problems in the prior art. Since the fan rotation speed control system of the present invention has the same structure with that in FIG. 1, the following will describe the embodiment of the present invention therewith. However, it should be noted that although the present invention and the prior art share the same components (with the same symbols), it does not mean that the shared components have the same function. In some embodiments, the fan rotation speed control system 100 of the present invention is a part of a computer system which controls the rotation speed of the fan 140 for dissipating heat from the CPU1 10, and comprises a fan rotation speed controller 130 and a master controller 120. Specifically, when the computer system is a laptop computer, the master controller 120 is an embedded controller (EC). However, those skilled in the art can understand the fan rotation speed control system 100 can not only be used in a laptop computer, but also be used in various computer systems and electronic devices. In addition, in some embodiments the fan rotation speed controller 130 and master controller 120 can be separated from or integrated with each other.

The fan rotation speed controller 130 of the present invention, coupled to the fan 140, is used to receive signal values from the master controller 120, and provide driving voltages to the fan 140 based on the signal values. In addition, the fan rotation speed controller 130 continually detects the actual rotation speed of the fan, and reports it to the master controller 120. The master controller 120, coupled to the fan rotation speed controller 130, is used to provide the signal values to the fan rotation speed controller 130. However, note that the master controller 120 of the present invention and that in the prior art sends the signal values in two different manners. Specifically, the master controller 120 of the present invention controls the rotation speed by recalculating the signal values by comparing the difference between the actual rotation speed and a target rotation speed, rather than by sending the signal values in "progression" as described in the prior art. The purpose of the present invention is to make the fan reach the target rotation speed more rapidly. The manner that the master controller 120 calculates a new signal value will be described in detail with the following embodiments.

First Embodiment

In this embodiment, the master controller 120 recalculates the signal values by performing interpolation based on the actual rotation speed and the target rotation speed. For illustration, in this embodiment, it is given that the target rotation speed is 3000 rpm, and the signal values provided by the master controller 120 are in hexadecimal coding from 00 to 9F. Before the fan starts to rotate, the master controller 120 may provide an initial signal value which is not zero, for example, 20, arbitrarily or based on the experience of a system designer. Then, the fan rotation speed controller 130 linearly adjusts the driving voltages outputted to the fan 140 based on the signal value (i.e., 20) received from the EC 120, so that the fan 140 increases its rotation speed to an initial speed directly. It should be noted that since the fans controlled by the fan rotation speed controller 130 may come from difference sources and may have different voltage-rotation speed characteristics, the fan rotation speed control system 100 is unable to predict what value the actual initial rotation speed will be. If the fan rotation speed controller 130 detects that the initial rotation speed is 2000 rpm, by using interpolation, a next signal value sent by the EC 12 has to be increased from 20 to 30 to reach the target rotation speed of 3000 rpm. If the EC 120 sends the signal values every second, the fan rotation speed control system 100 in this embodiment would only need two seconds for the fan 140 to reach the target rotation speed.

Second Embodiment

In this embodiment, the master controller 120 sorts the difference between the actual rotation speed and the target rotation speed into several levels, and recalculates the signal values by referring to a difference mapping table which may be built in the master controller 120. For illustration, in this embodiment, it is given that the target rotation speed is 3000 rpm, and the signal values provided by the master controller 120 are in hexadecimal coding from 00 to 9F. Before the fan starts to rotate, the master controller 120 may provide an initial signal value which is not zero, for example, 20, arbitrarily or based on the experience of a system designer. Then, the fan rotation speed controller 130 linearly adjusts the driving voltages outputted to the fan 140 based on the signal value (i.e., 20) received from the EC 120, so that the fan 140 increases its rotation speed to an initial speed directly. Similarly, it should be noted that since the fans controlled by the fan rotation speed controller 130 may come from difference sources and may have different voltage-rotation speed characteristics, the fan rotation speed control system 100 may be unable to predict what value the actual initial rotation speed will be. For illustration, the fan rotation speed controller 130 detects that the initial rotation speed is 2000 rpm. Different from the previous embodiment, the master controller 120 sorts the differences between the target rotation speeds and the actual rotation speeds into several levels and thus a difference mapping table as follows is built:

| ⟨difference mapping table⟩ | |
| --- | --- |
| target rotation speed-actual rotation speed (rpm) | signal value increment |
| >1000 | +32 |
| 500~1000 | +16 |
| 100~500 | +8 |
| 0~100 | +1 |
| 0~−100 | −1 |
| −100~−500 | −8 |
| −500~−1000 | −16 |
| <−1000 | −32 |

From this mapping table, it can be found that when the initial speed is lower than the target rotation speed by 500~1000 rpm, the signal value increment will be +16, and thus the next signal value sent by the EC 120 should be increased from 20 to 30 (hexadecimal coding). If the EC 120 sends the signal values every second, the fan rotation speed control system 100 in this embodiment only needs one second for the fan 140 to reach the target rotation speed. Note that the sorting and the values in the difference mapping table is listed for illustration and can be modified and optimized in accordance with actual configuration of the fan in different embodiments, and thus the present invention should not be limited thereto.

Third Embodiment

This embodiment is the combination and modification of the previous embodiments. In this embodiment, the master controller 120 recalculates the signal values by performing binary approximation based on the actual rotation speed and the target rotation speed. For illustration, in this embodiment, it is given that the target rotation speed is 3000 rpm, and the signal values provided by the master controller 120 are in hexadecimal coding from 00 to 9F. Before the fan starts to rotate, the master controller 120 may provide an initial signal value which is not zero, for example, 20, arbitrarily or based on the experience of a system designer. Then, the fan rotation speed controller 130 linearly adjusts the driving voltages outputted to the fan 140 based on the signal value (i.e., 20) received from the EC 120, so that the fan 140 increases its rotation speed to an initial speed directly. It should be noted that since the fans controlled by the fan rotation speed controller 130 may come from difference sources and may have different voltage-rotation speed characteristics, the fan rotation speed control system 100 is unable to predict what value the actual initial rotation speed will be. For illustration, the fan rotation speed controller 130 detects that the initial rotation speed is 2000 rpm. Different from the first embodiment, the fan rotation speed control system 100 in this embodiment approaches the target rotation speed in a more moderate manner. For example, firstly, the EC 120 sets a first transition rotation speed of 2500 rpm (which equals to the average of the target rotation speed 3000 rpm and the initial rotation speed 2000 rpm), and thus, by interpolation, increases the signal value from 20 to 25; then, if the EC 120 detects that the actual rotation speed increases to 2500 rpm, the EC 120 sets a second transition rotation speed of 2750 rpm (which equals to the average of the target rotation speed 3000 rpm and the actual rotation speed 2500 rpm), and so on till the difference between the actual rotation speed and the target rotation speed is within a specific range (for example, 100 rpm), wherein towards the end, the signal values in progression (signal values increase one by one) are sent till the actual rotation speed reaches the target rotation speed. In this embodiment, if the EC 120 sends the signal values every second, the fan rotation speed control system 100 needs twelve seconds for the fan to reach the target rotation speed.

Figure 2:
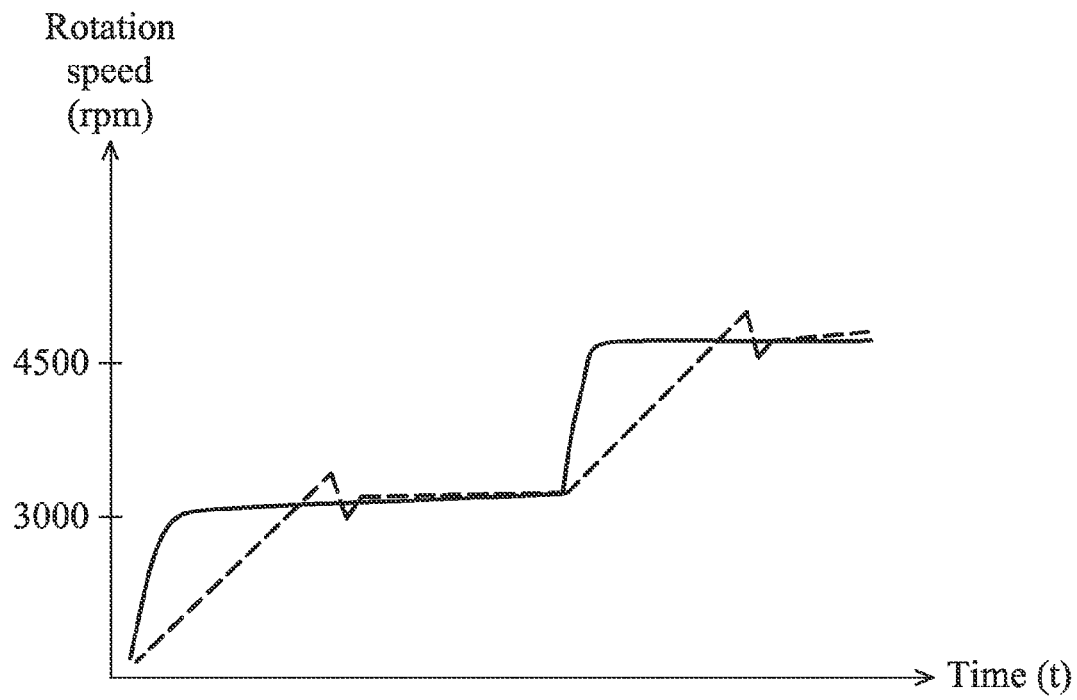
FIG. 2 shows the relationships between the actual rotation speed and time of the present invention and the prior art.

In the previous embodiments, various manners for the master controller 120 of the present invention to control the fan rotation speed have been discussed in detail, however, those skilled in the art can understand that these manners can be properly modified and integrated with each other and the present invention should not be limited thereto. In the previous embodiment, the rotations all start from a zero speed, but in other embodiments, the present invention also can control the fan to change its rotation speed among various levels, as shown in FIG. 2. FIG. 2 shows the relationships between the actual rotation speed and time of the present invention and the prior art, where the solid line represents the present invention and the dotted line represents the prior art. From FIG. 2, it can be easily found that the present invention can reach the target rotation speed (3000 rpm level or 4500 rpm level) in a shorter time and in a more stable way.

Fan Rotation Speed Control Method

Figure 3:
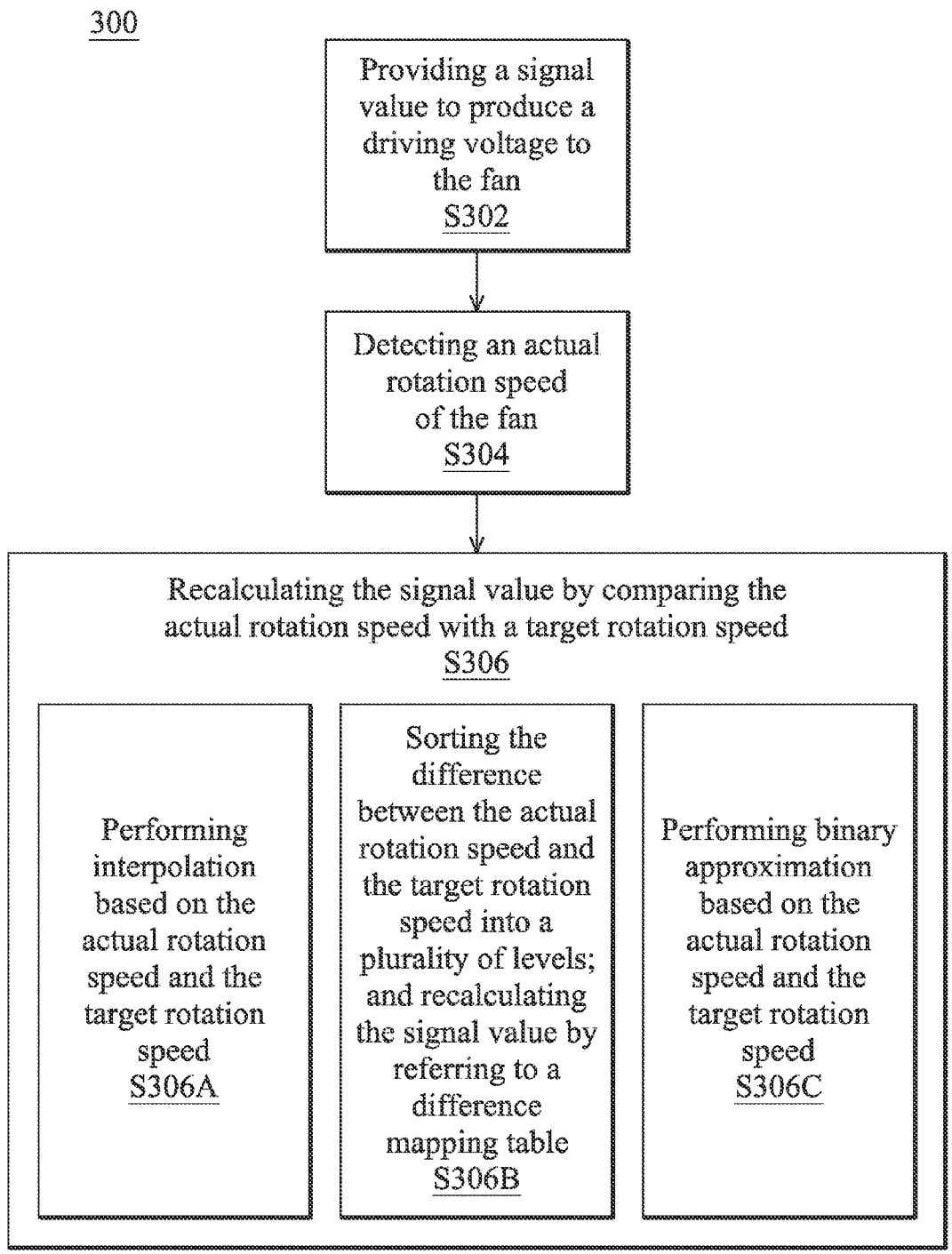
FIG. 3 shows a flow chart of the fan rotation speed control method of the present invention.

The fan rotation speed control system has been fully described above. In addition to the fan rotation speed control system, the present invention further provides a fan rotation speed control method. FIG. 3 is a flow chart of the fan rotation speed control method of the present invention. The fan rotation speed control method 300 of the present invention, used to control rotation speed of a fan (e.g., fan 140 in FIG. 1) comprises: in step S302, providing a signal value to produce a driving voltage to the fan (e.g., in FIG. 1, the master controller 120 provides the signal value); in step S304, detecting an actual rotation speed of the fan (e.g., in FIG. 1, the fan rotation speed controller 120 detects the actual rotation speed); and in step S306, recalculating the signal value by comparing the actual rotation speed with a target rotation speed (e.g., in FIG. 1, performed by the master controller 120). Note that the S306 of the present invention has various embodiments. Refer to the First Embodiment. Step S306 further comprises recalculating the signal values based on the actual rotation speed and the target rotation speed (S306A). Refer to the Second Embodiment. Step S306 further comprises sorting the difference between the actual rotation speed and the target rotation speed into a plurality of levels and recalculating the signal values by referring to a difference mapping table (S306B). Refer to the Third Embodiment. Step S306 further comprises performing interpolation based on the actual rotation speed and the target rotation speed (S306C). Since those skilled in the art can understand that the present method by reading the embodiments described previously, for brevity, the embodiments of the present method will not be further discussed.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A fan rotation speed control system for controlling a rotation speed of a fan, comprising:
   a fan rotation speed controller, coupled to the fan, for receiving a signal value to produce a driving voltage to the fan and detecting an actual rotation speed of the fan; and
   a master controller, coupled to the fan rotation speed controller, for providing the signal value and recalculating the signal value by comparing the actual rotation speed with a target rotation speed,
   wherein the master controller recalculates the signal value by performing a binary approximation method based on the actual rotation speed and the target rotation speed,
   wherein the master controller in the binary approximation method further sets at least one transition rotation speed, which equals to an average of the actual rotation speed and the target rotation speed; recalculates the signal value by interpolation based upon the transition rotation speed and the target rotation speed; provides a recalculated signal value to the fan rotation speed controller until the difference between the actual rotation speed and the target rotation speed is within a specific range; and then sends the recalculated signal values in progression until the actual rotation speed reaches the target rotation speed.

2. The fan rotation speed control system as claimed in claim 1, wherein the master controller sorts the difference between the actual rotation speed and the target rotation speed into a plurality of levels, and recalculates the signal value by referring to a difference mapping table built in the master controller.

3. The fan rotation speed control system as claimed in claim 1, wherein the master controller recalculates the signal value by performing interpolation based on the actual rotation speed and the target rotation speed.

4. The fan rotation speed control system as claimed in claim 1, wherein the fan is used to control a temperature of a central processing unit (CPU).

5. The fan rotation speed control system as claimed in claim 1, wherein the fan rotation speed control system is disposed in a computer, and the master controller is an embedded controller (EC).

6. A fan rotation speed control method for controlling rotation speed of a fan, comprising the steps of:
   providing a signal value to produce a driving voltage to the fan;
   detecting an actual rotation speed of the fan; and
   recalculating the signal value by comparing the actual rotation speed with a target rotation speed,
   wherein the step of recalculating the signal value further comprises:
   performing binary approximation based on the actual rotation speed and the target rotation speed
   wherein the step of performing binary approximation further comprises steps of:

setting at least one transition rotation speed, which is equal to an average of the actual rotation speed and the target rotation speed;

recalculating the signal value by interpolation based upon the transition rotation speed and the target rotation speed;

providing recalculated signal values until the difference between the actual rotation speed and the target rotation speed is within a specific range; and then sending the recalculated signal values in progression until the actual rotation speed reaches the target rotation speed.

7. The fan rotation speed control method as claimed in claim 6, wherein the step of recalculating the signal value further comprises:

sorting the difference between the actual rotation speed and the target rotation speed into a plurality of levels; and recalculating the signal value by referring to a difference mapping table.

8. The fan rotation speed control method as claimed in claim 6, wherein the step of recalculating the signal value further comprises:

performing interpolation based on the actual rotation speed and the target rotation speed.

\* \* \* \* \*